(12) United States Patent
Ganesan et al.

(10) Patent No.: US 11,756,045 B2
(45) Date of Patent: Sep. 12, 2023

(54) SYSTEM AND METHOD FOR WARRANTY CUSTOMIZATION BASED ON DEVICE LOCATION AND PROXIMITY TO SERVICE CENTER

(71) Applicant: Dell Products, L.P., Round Rock, TX (US)

(72) Inventors: Vaideeswaran Ganesan, Bangalore (IN); Praveen Lalgoudar, Bangalore (IN); Sandeep Venkatesh Pai, Bengaluru (IN); Rekha M S, Karnataka (IN); Nikhil S, Thiruvananthapuram (IN); Pandiyan Varadharajan, Bangalore (IN); Rushyendra Velamuri, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 144 days.

(21) Appl. No.: 17/409,848

(22) Filed: Aug. 24, 2021

(65) Prior Publication Data

US 2023/0024472 A1  Jan. 26, 2023

(30) Foreign Application Priority Data

Jul. 23, 2021 (IN) ............................ 202111033233

(51) Int. Cl.
*G06Q 30/012* (2023.01)
*G06Q 10/20* (2023.01)
(Continued)

(52) U.S. Cl.
CPC .......... *G06Q 30/012* (2013.01); *G06Q 10/20* (2013.01); *G06Q 50/28* (2013.01); *H04W 28/24* (2013.01)

(58) Field of Classification Search
CPC ....... G06Q 30/012; G06Q 10/20; G06Q 50/28
See application file for complete search history.

(56) References Cited

U.S. PATENT DOCUMENTS 10,437,660 B2 * 10/2019 Bikumala ............ G06Q 30/016
10,733,240 B1 * 8/2020 Callahan ............... G06Q 10/10
(Continued)

FOREIGN PATENT DOCUMENTS

| CA | 2637046 A1 * | 8/2007 | ............ G06Q 10/00 |
| WO | WO-02067136 A1 * | 8/2002 | ......... H04L 12/2602 |
| WO | WO-2019049042 A1 * | 3/2019 | ............ G06N 20/00 |

OTHER PUBLICATIONS

Anonymous "Agiloft Wins 2021 Business Intelligence Group Innovation Award for AI Core: Leading contract lifecycle management software provider recognized for innovation in its Agiloft AI Core technology to accelerate contract transformation," PR Newswire, 2021. (Year: 2021).*

*Primary Examiner* — Gerardo Araque, Jr.
(74) *Attorney, Agent, or Firm* — Fogarty LLP

(57) ABSTRACT

Custom-tailored warranties are provided with improved service level agreements (SLA) based upon an estimated turnaround time for service and/or parts. The turnaround time is calculated using an artificial intelligence or machine learning engine considering parameters such as the transit time from the nearest service centers and warehouses, the availability of service engineers at the service centers, and the availability of replacement parts in the warehouse. A custom-tailored warranty also may be offered for a specific customer-selected SLA if supported by the estimated turnaround time for the location. A warranty recommendation may be based on device location for data centers in multiple locations. A Location-Based Warranty Monitor (LBWM) provides fine-grained warranty suggestions and Un-bound (Continued)

Warranty Tokens (UWTs) can be bound to a system to assign a warranty with a desired. SLA.

6 Claims, 8 Drawing Sheets

(51) Int. Cl.
*G06Q 50/28* (2012.01)
*G06N 3/04* (2023.01)
*H04W 28/24* (2009.01)

(56) References Cited

U.S. PATENT DOCUMENTS

| | | | |
|---|---|---|---|
| 11,012,337 B1* | 5/2021 | Bikumala | H04L 41/149 |
| 11,449,921 B2* | 9/2022 | Tennur Narayanan | G06N 5/04 |
| 11,610,252 B2* | 3/2023 | Bikumala | G06Q 30/0635 |
| 2017/0249565 A1* | 8/2017 | Vichare | G06F 11/079 |
| 2018/0329768 A1* | 11/2018 | Bikumala | G06F 11/079 |
| 2019/0146436 A1* | 5/2019 | Perez Zarate | H04N 1/00209 |
| | | | 700/287 |
| 2020/0026916 A1* | 1/2020 | Wood | G06V 30/416 |
| 2020/0320539 A1* | 10/2020 | Vanga | G06Q 30/012 |
| 2020/0410617 A1* | 12/2020 | Wichern | G06Q 30/0185 |
| 2021/0019799 A1* | 1/2021 | Koch | G06Q 30/0621 |
| 2021/0117307 A1* | 4/2021 | MacNamara | G06F 11/302 |
| 2021/0176276 A1* | 6/2021 | Kursun | G06Q 10/06 |
| 2021/0201013 A1* | 7/2021 | Makhija | G06V 30/414 |
| 2021/0398187 A1* | 12/2021 | Tennur Narayanan | |
| | | | G06Q 30/012 |
| 2021/0406976 A1* | 12/2021 | Sethi | G06Q 30/0631 |
| 2022/0019498 A1* | 1/2022 | Ranganathan | H04M 3/5233 |
| 2022/0036214 A1* | 2/2022 | Venugopal | G06N 20/00 |

* cited by examiner

SYSTEM AND METHOD FOR WARRANTY CUSTOMIZATION BASED ON DEVICE LOCATION AND PROXIMITY TO SERVICE CENTER

CROSS REFERENCE TO RELATED APPLICATIONS

This patent application claims priority to co-pending, commonly assigned Indian Patent Application No. 202111033233, filed Jul. 23, 2021 and entitled "System and Method for Warranty Customization Based on Device Location and Proximity to Service Center," the entire contents of which are incorporated by reference herein.

FIELD

The present disclosure generally relates to Information Handling Systems (IHSs), and, more particularly, to providing a customized warranty based on a device's location and proximity to a service center.

BACKGROUND

Information Handling Systems (IHSs) process, compile, store, and/or communicate information or data for business, personal, or other. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within racks. A data center may include large numbers of such server racks that are organized into rows of racks. Administration of such large groups of IHSs may require teams of remote and local administrators working in shifts in order to support around-the-clock availability of the data center operations while minimizing any downtime. A data center may include a wide variety of hardware systems and software applications that may each be separately covered by warranties. The warranties available for a particular data center are typically based upon the tier of the city where the data center is located, the type of devices in the data center, and customer preferences. An IT operation center may manage IHSs residing in multiple geographic locations. The applicable warranty for those IHs depends on where the server is located. Accordingly, an IT operation center may have to deal with different warranties across different data centers.

SUMMARY

Systems and methods provide custom-tailored warranties with improved service level agreements (SLA). An estimated turnaround time for service and/or parts is calculated using an artificial intelligence or machine learning engine considering parameters such as the transit time from the nearest service centers and warehouses, the availability of service engineers at the service centers, and the availability of replacement parts in the warehouse. A warranty with the best possible SLA in view of the estimated turnaround time is then offered to the customer. Similarly, a custom-tailored warranty may be offered for a specific customer-selected SLA if supported by the estimated turnaround time for the location.

In other embodiments, systems and methods provide warranty recommendation based on device location for data centers in multiple locations. A Location-Based Warranty Monitor (LBWM) provides fine-grained warranty suggestions based upon the system location, the current system warranty, and the warranties served in a specific location. Un-bound Warranty Tokens (UWTs) are digital warranty tokens that can be bound to a system to assign a warranty with a desired. SLA. The UWTs can be purchased by users in advance and applied to systems later based on deployment criteria. UWTs can be used by customers to dynamically assign to a system's serial number or service based on an LBWM recommendation. The LBWM identifies the exact location of the system, determines an existing warranty, and compares the current warranty with all warranty offerings for that location in order to recommend all potential warranties from which the customer user can choose an optimal warranty for data center requirements.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Figure 1:
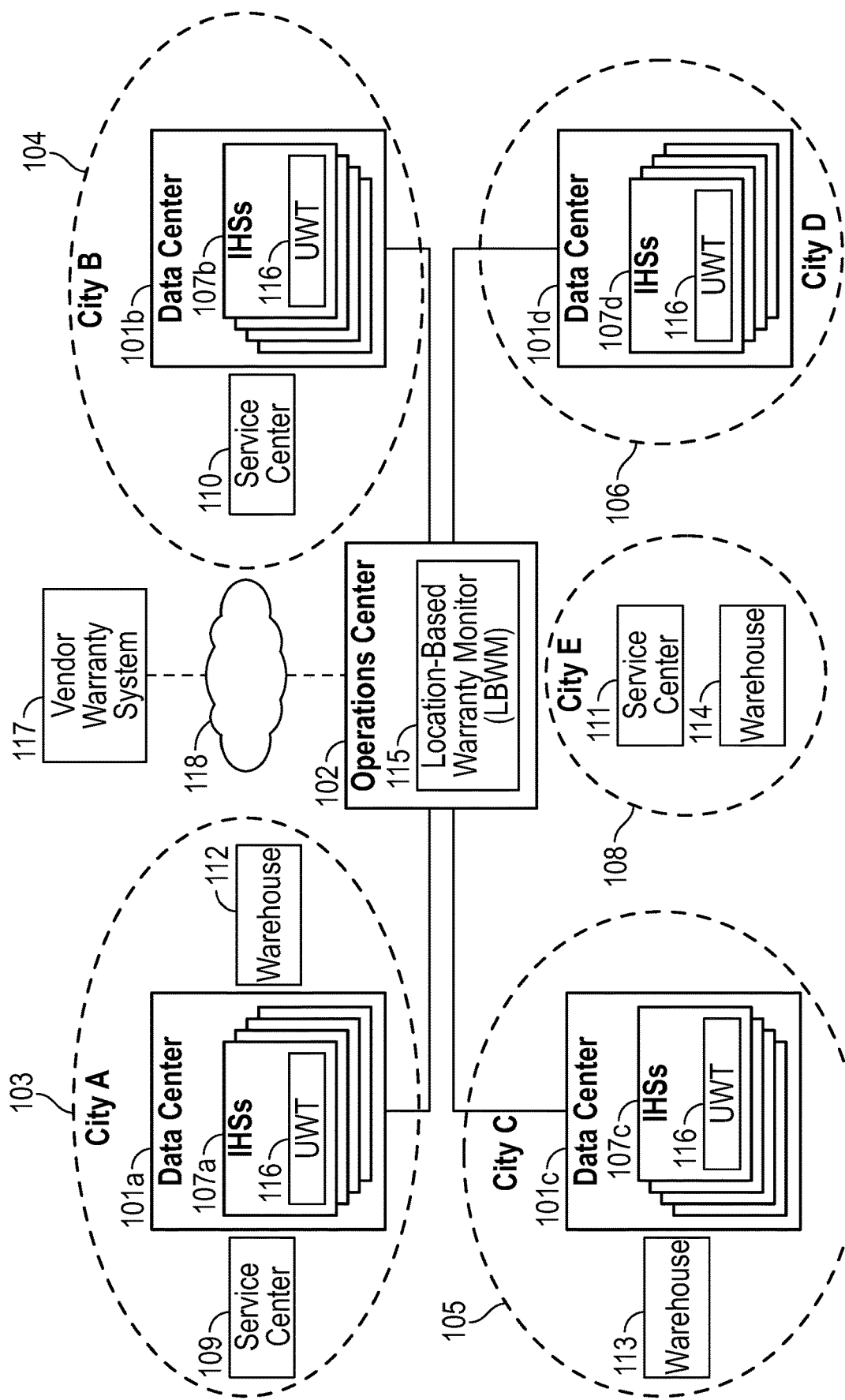
FIG. 1 is a block diagram illustrating a plurality of data centers that are managed by a central operations center according to an example embodiment.

FIG. 1 is a block diagram illustrating a plurality of data centers 101*a-d* that are managed by a central operations center 102. Each data center 101*a-d* is located in a different city 103-106. Data centers 101*a-d* may include a large number of IHSs 101*a-d* that may be installed as components of a chassis. Multiple chassis may be housed within a rack, and data centers 101*a-d* may utilize large numbers of racks, with various different types of chassis installed in the various rack configurations. By configuring a chassis with different IHS 107*a-d*, the chassis may be adapted to support specific types of operations, thus providing a computing solution that is directed toward a specific type of computational task. Components of the IHSs 107*a-d* may be provided by multiple vendors and may be installed at different times. Accordingly, data center administrators at operations center 102 need to track and assess the warranty coverage of the components within the various data centers 101*a-d*. Certain components of operations center 102 and/or data centers 101*a-d* may be configured to implement the systems and methods described herein.

IHSs 107*a-d* may comprise a remote access controller, baseboard management controller, or chassis management controller that allows information technology (IT) administrators at a remote operations center 102 to deploy, update, monitor, and maintain IHSs 107*a-d* remotely. (BMC). As a non-limiting example of a remote access controller, the integrated Dell Remote Access Controller (iDRAC) from Dell® is embedded within Dell PowerEdge™ servers and provides such remote functionality.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS 107*a-d* may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS 107*a-d* may include Random Access Memory (RAM), one or more processing resources such as a Central Processing Unit (CPU) or hardware or software control logic, Read-Only Memory (ROM), and/or other types of nonvolatile memory. Additional components of an IHS 107*a-d* may include one or more disk drives, one or more network ports for communicating with external devices as well as various I/O devices, such as a keyboard, a mouse, touchscreen, and/or a video display. An IHS 107*a-d* may also include one or more buses operable to transmit communications between the various hardware components.

IHSs 107*a-d* may be used to support a variety of e-commerce, multimedia, business, and scientific computing applications. In some cases, these applications may be provided as services via a cloud implementation. IHSs 107*a-d* are typically configured with hardware and software that provide leading-edge computational capabilities. IHSs 107*a-d* may also support various numbers and types of storage devices. Accordingly, services provided using such computing capabilities are typically provided as high-availability systems that operate with minimum downtime. The warranties provided by vendors of IHSs 107*a-d* and the related hardware and software allow the data centers 101*a-d* to provide contracted SLA to customers. Upon failure of an IHS 107*a-d*, data centers 101*a-d* and operations center 102 typically relies on manufacturer, seller, or re-seller warranty to provide support in order to maintain contracted SLAs.

In the illustrated embodiment of FIG. 1, data centers 101*a-d* are located in different cities 103-106, and each city 103-106 has different levels of service available. Another city 108 may provide vendor warranty support but has no data center associated with operations center 102. Service centers 109 and 110, respectively, are available in cities 103 and 104. Accordingly, if on-site technical support is needed, then data centers 107*a,b* would have the necessary support type available locally. On the other hand, data centers 107*c,d* would have to rely on support from service centers 109-111 in another city. Service centers 109-110 may also be staffed so that various combinations of support levels (e.g., L1, L1+L2, L1 +L2+L3) may be available at different service centers. Similarly, warehouses 112, 113, respectively, are available in cities 103 and 105. Accordingly, if replacement parts are needed, then data centers 107*a,c* would more likely have the required parts available locally. On the other hand, data centers 107*b,d* would have to rely on parts shipped from warehouses 112-114 in another city. Cities 103-106 may be ranked as Tier 1, Tier 2, etc. based upon the availability of service centers and warehouses.

Existing support plans typically are offered based on a vendor's predefined set of warranty offerings for devices based on following criteria such as the tier of the city where a data center is located, a device type, and a customer preference. However, since the warranties are not tailored to suit each customer specifically, vendors are not able to achieve maximum revenue potential that might otherwise be generated by leveraging parameters specific to each customer. If a customer's data center is located very near to a vendor's service center and warehouse, then the vendor may provide a warranty with improved SLA to that customer instead of limiting the customer to SLAs from the standard warranty offerings. For example, a standard Tier 1 warranty may offer a replacement SLA of four hours; however, since, IHSs 107*a* at data center 101*a* are located near a service center 109 and warehouse 112, the vendor may desire to offer a non-standard warranty replacement SLA of one hour for IHSs 107*a* at data center 101*a*.

In one embodiment, vendors may derive custom-tailored or premium data center warranties with improved SLA based on a device's proximity to a service center. For a given data center, the estimated repair/replacement turnaround time is calculated using an artificial intelligence (AI) or machine learning (ML) engine considering following parameters: the transit time from the vendor's nearest service centers and warehouses, the availability of service engineers at the nearest service center, and the availability of replacement parts in the nearest warehouse. Considering the turnaround time, the vendor then offers a warranty with the best possible SLA. The vendor may also determine the feasibility of a customer's desired SLA based on the turnaround time calculation. The tools for offering customized warranties may be integrated in the vendor's customer relationship management (CRM) system to provide options for better customer SLA recommendations. The determination of a best possible SLA may be based on a warranty replacement SLA, which is the level of services expected by a customer from a vendor (e.g., next business day (NBD), second business day (SBD), four hours (4H), eight hours (8H), mission critical (MC), etc.). Alternatively, or additionally, the best possible SLA may be based on a warranty support type, which relates to the types of support provided by a vendor (e.g., level one, two, or three (L1, L1+L2, L1+L2+L3), Post Support, etc.).

The availability of such custom-tailored warranties will better serve customers by providing tighter warranties, which will reduce data center and IHS downtime. Additionally, the premium or custom-tailored warranties allow the vendor to maximize revenue by offering targeted and requested warranties, which improves the customer experience. The vendor's warehouse management may improve readiness by serve incoming requests and action items quickly. The details regarding various customers' desired SLAs can be used for making decisions on future expansion of the vendor's service delivery infrastructure. For example, data regarding requests for customer SLAs may be used to determine where to position future service centers and warehouses. The creation of custom-tailored warranties as described herein is an improvement over existing standard warranties. Custom-tailored warranties are generated based on device proximity for service delivery and are dynamically created using an AI/ML engine to monitor incoming incidents and to ensure part and engineer availability. Existing warranties use a static mapping between the tier of the city and the warranty offerings.

Figure 2:
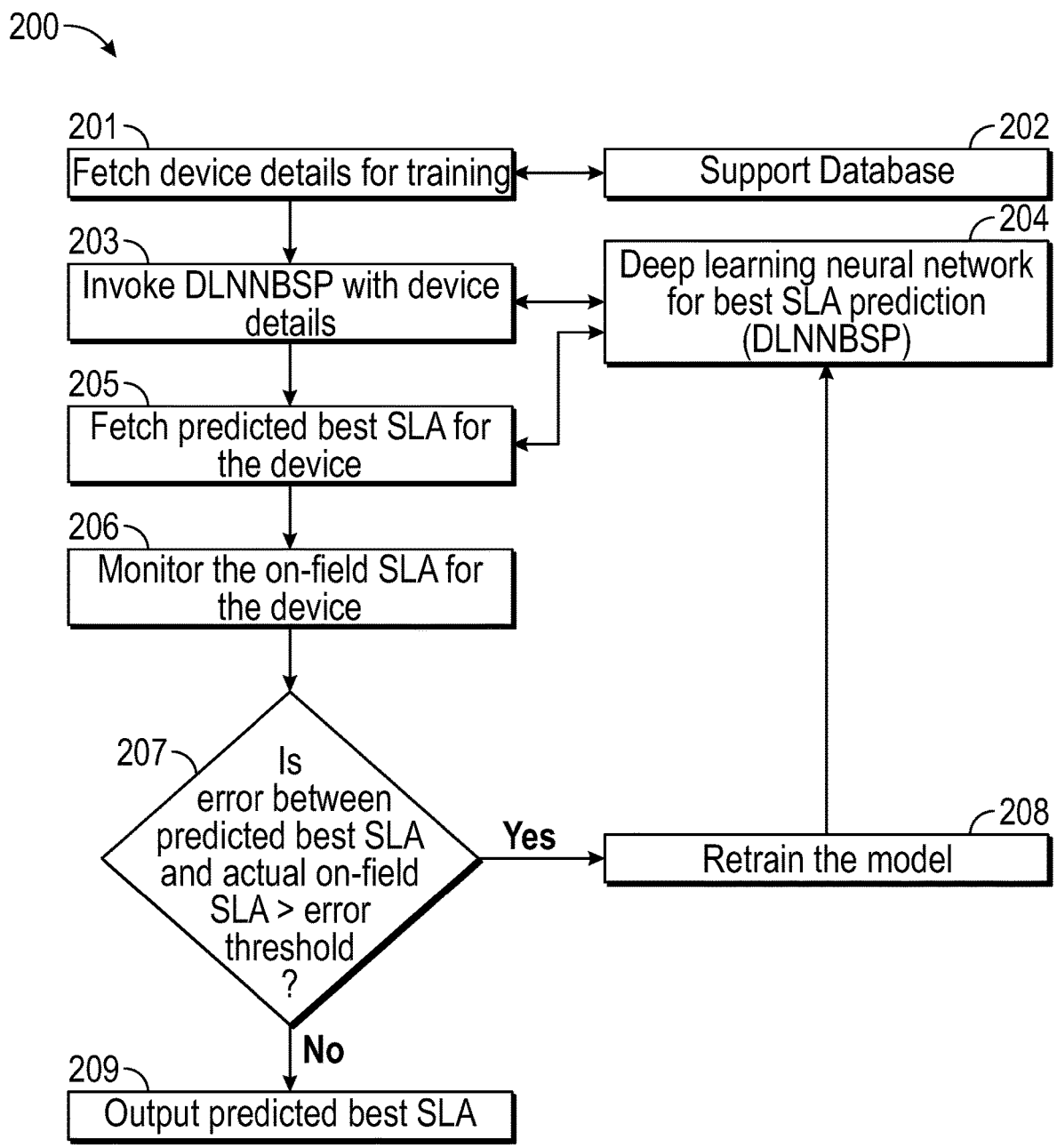
FIG. 2 is a flowchart illustrating a process for predicting the best possible SLA using a deep learning neural network.

FIG. 2 is a flowchart 200 illustrating a process for predicting the best possible SLA using a deep learning neural network. In step 201, device details are fetched from a support database 202 for training an SLA predictor engine. Support database 202 may store information such as a device location, parts availability, service engineer availability, logistics delivery team availability, historical service SLA data, proximity between a data center and service centers, proximity between a data center and warehouses, service time as logged by service engineers, and delivery time as logged by logistics delivery teams. In step 203, a Deep Learning Neural Network for Best SLA Prediction (DLNNBSP) 204 is invoked using the device details. The DLNNBSP 204 may use a random forest algorithm to arrive at a strict SLA. The DLNNBSP engine 204 selects random data features from the training set and builds decision trees to calculate a best SLA for each data feature set. During the training phase, each DLNNBSP decision tree produces an SLA prediction. Then, a final SLA is predicted by taking an average of the SLA predictions for each feature set. In step 205, the predicted best SLA for the device is fetched from the DLNNBSP 204.

DLNNBSP may be an AI/ML engine or processor that executes software instructions that operate to combine large amounts of data with fast, iterative processing and intelligent algorithms, which thereby allow the software to automatically learn from patterns and features in the data. DLNNBSP may use machine learning, which automates analytical model building using methods from neural networks and statistics to find insights into data without explicitly programming regarding what to look for and what to conclude. A neural network is made up of interconnected units that processes information by responding to external inputs and relaying information between each unit. The process may require multiple iterations processing the data to find connections and derive meaning from unstructured data. The DLNNBSP may use advanced algorithms to analyze large amounts of data faster and at multiple levels. This allows intelligent processing for identifying and predicting rare events, understanding complex systems, and identifying unique scenarios. The DLNNBSP may use application programming interfaces (APIs) to add functionality to existing systems and software. The DLNNBSP can reason on input data and output an explanation of the data.

In step 206, the on-field SLA for the device is monitored. The actual on-field service times and delivery times may be stored to support database 204. In step 207, the predicted best SLA is validated against actual on-field SLA to check whether or not the predicted best SLA was met. An error margin may be calculated between the predicted best SLA and the actual on-field SLA. If the error margin is more than predefined threshold of 0.5%, for example, then updated on-field SLA feedback is used in step 208 to train the engine to arrive at more accurate SLAs. The on-field SLA will be better for devices that have a service center and warehouse in close proximity. Once the model is trained and the error is below a threshold value, then the best SLA can be predicted using the device details as input to DLNNBSP engine 204. The predicted best SLA is then output in step 209.

Figure 3:
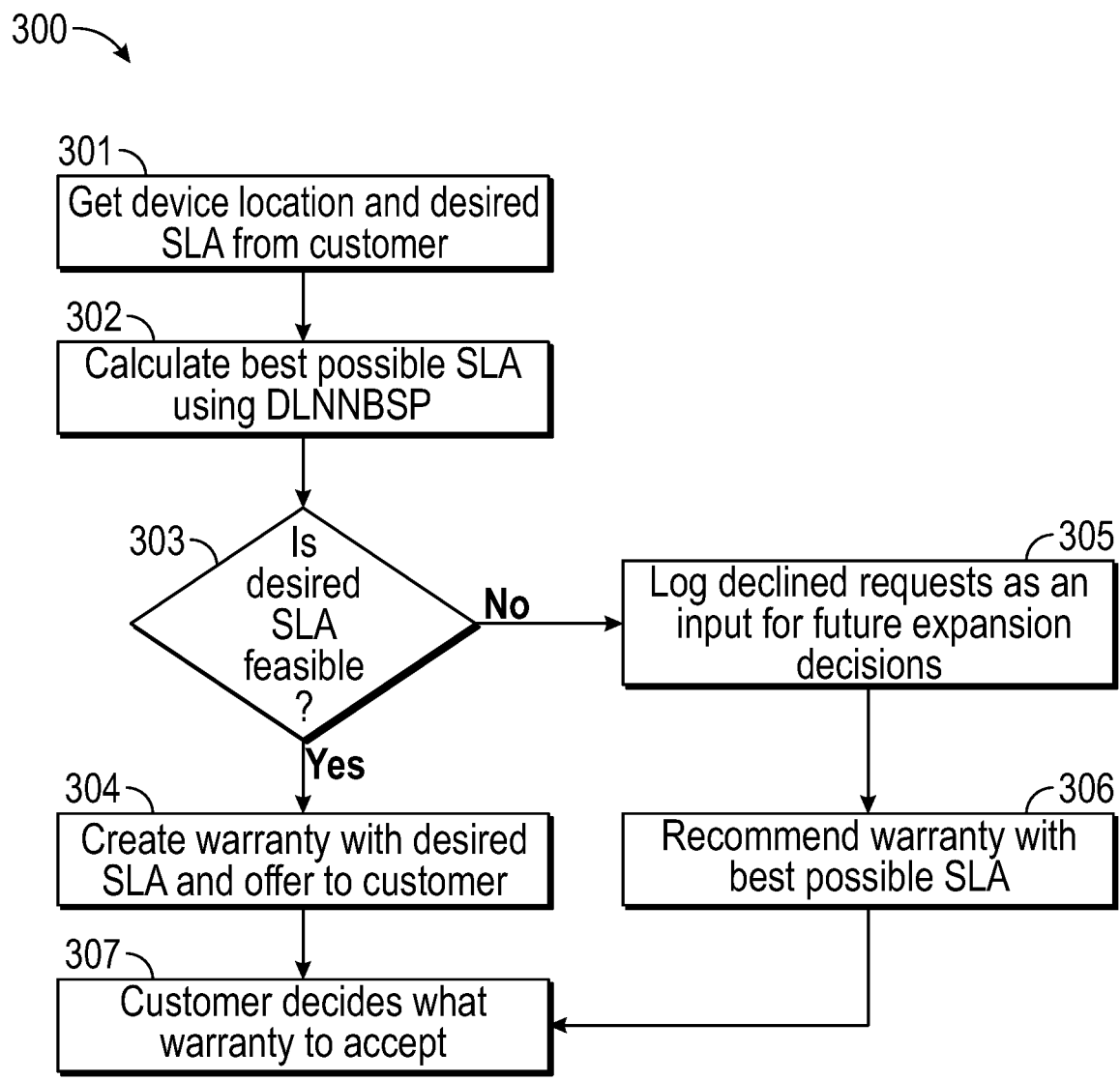
FIG. 3 is a flowchart illustrating a process for evaluating the feasibility of dynamic warranty creation using a customer-requested SLA.

FIG. 3 is a flowchart 300 illustrating a process for evaluating the feasibility of dynamic warranty creation using a customer-requested SLA. In some situations, a customer may request a specific SLA for a particular location. The vendor's services sales team may evaluate the requested SLA and take required actions to support the requested SLA. In step 301, the device location and desired warranty SLA are received from the customer. In step 302, the best possible SLA is calculated using DLNNBSP. In step 303, the customer's desired SLA is compared to the calculated best possible SLA to determine whether the requested SLA is feasible. If the requested SLA is feasible, then in step 304 the vendor's sales team creates a custom warranty with the requested SLA, calculates its cost, and offers that warranty to the customer.

If the customer's desired SLA is not feasible at step 303, then in step 305 the requested SLA is logged for input for future service center and warehouse expansion decisions. The on-field SLA will be better for devices that have a service center and warehouse in close proximity, so future locations may be selected based on the customers' desired SLA. In step 306, the vendor's sales team recommends a warranty with the best possible SLA to the customer. In step 307, the customer decides what warranty to accept among the available options.

Figure 4:
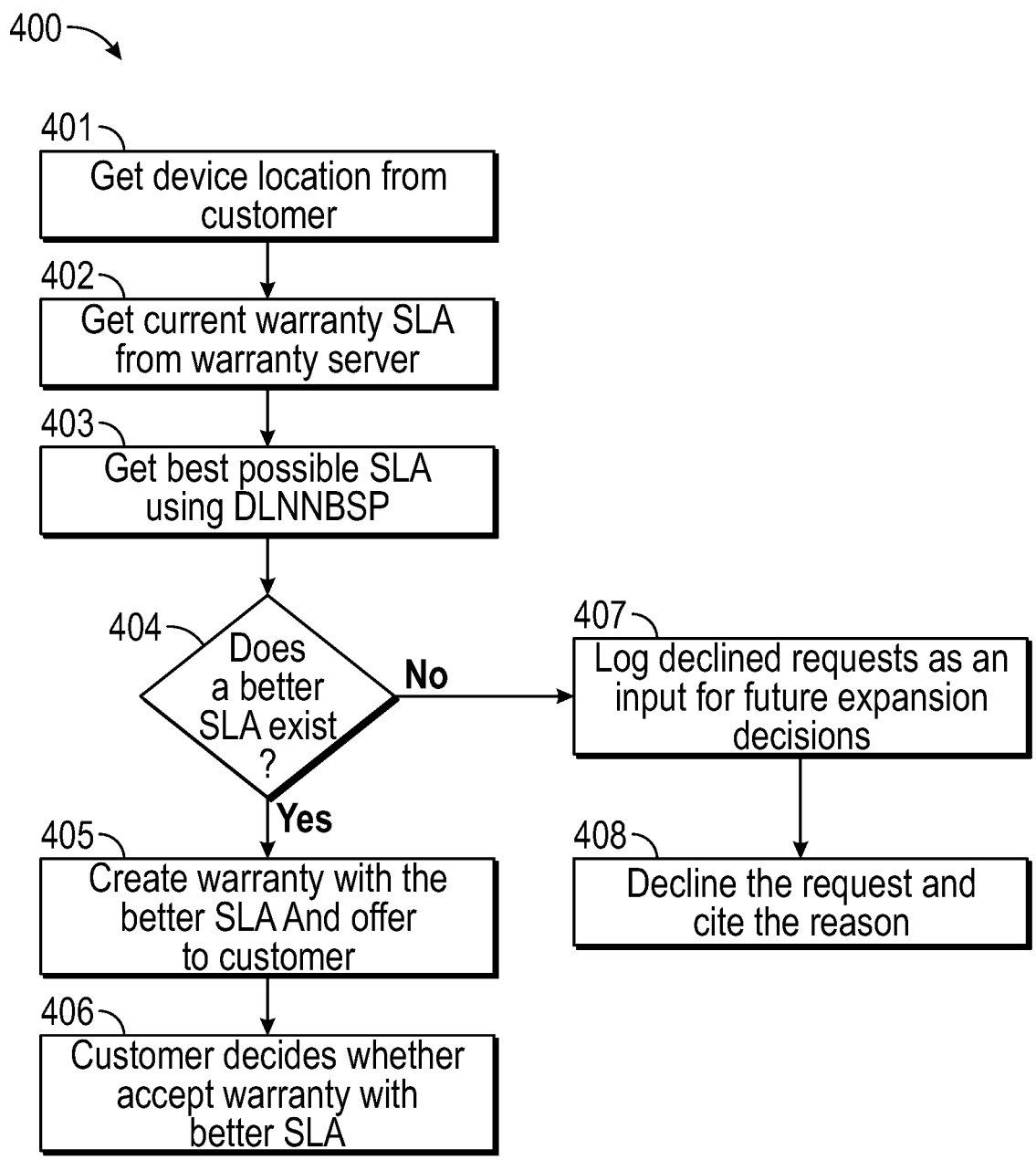
FIG. 4 is a flowchart illustrating a process for providing one-time, expedited service for customers.

FIG. 4 is a flowchart 400 illustrating a process for providing one-time, expedited service for customers. In some situations, a customer may request a quicker response for a failure than the SLA offered by the customer's current warranty. For example, if the customer is experiencing an unusually high workload and/or failure rate, then the customer may need a replacement or repair in a shorter time than normal required. A vendor's services sales team may evaluate the requested SLA using the DLNNBSP engine and take appropriate action to support the requested service. In step 401, the customer provides the device location and, in step 402, the customer's current warranty terms, including SLA, are retrieved from the vendor's records, such as from a warranty server. In step 403, the best possible SLA is obtained using the DLNNBSP engine using the device location provided by the customer. In step 404, the customer's current SLA and the best possible SLA calculated by DLNNBSP are compared to determine if a better SLA exists than currently assigned to the customer.

If a better SLA is available, then in step 405 the vendor's sales team creates a custom warranty with the better SLA, calculates its cost, and offers that warranty to the customer. In step 406, the customer decides whether they accept the warranty with a better SLA. If a better SLA is not available at step 404, then in step 407 the declined request (i.e., declined because no better SLA is available) is logged for input for future service center and warehouse expansion decisions. In step 408, the vendor's sales team notifies the customer that a better SLA is not available.

In other embodiments, a vendor may make warranty recommendations based on a device location when the customer has data centers in multiple geographic locations. Referring again to FIG. 1, operations center 102 manages IHSs 107a-d, such as servers, residing in multiple geographic locations 103-106. The applicable warranty on each server depends on where the server is located. The SLA offered by a vendor will differ from location to location (e.g., across different Tier 1 and Tier 2 cities, etc.). Based on the warranty SLAs, a data center administrator or IT personal at operations center 102 have increased confidence in planning and critical workload distribution. However, a data center administrator located at central operations center 102 who is managing multiple data center locations 101a-d is not likely to be aware of the optimal warranty that the vendor offers in each region 103-106, changes in the warranty offerings by the vendor in each region 103-106, and warranty applicability after moving a server from one location to another, such as moving IHSs 107a to data center 101d.

This lack of knowledge regarding warranty SLAs across different data centers causes increased planning efforts and workload allocations. Additionally, customer procurement teams may purchase systems with a default warranty without considering how a deployment location may result in the warranty being non-optimal. For example, purchasing a premium warranty for servers that will be deployed in a location where premium services cannot be offered is a problem from a cost perspective.

As illustrated in FIG. 1, a Location-Based Warranty Monitor (LBWM) 115 is located at operations center 102 and Un-bound Warranty Tokens (UWTs) 116 are assigned to various IHSs and servers 107a-d. Using the LBWM 115 and UWTs 116, a system management console may determine the exact location of a system, identify an existing warranty for the system, and compare the existing warranty with all warranties offered by the vendor for that location. This allows a vendor to recommend all potential warranties for the location from which the data center administrator or other user can choose an optimal warranty. LBWM 115 monitors the status of devices and locations on an on-demand or scheduled basis. UWTs 116 may be dynamically assigned to a system serial number based on LBWM 115 recommendations. A customer may use this solution to update the warranty of a system dynamically based on actual location of the system. LBWM 115, operations center 102, or a system management console are in contact with a vendor warranty system 117 either directly or through a public network 118, such as the Internet. Changes to a warranty for a deployed IHS or sever is completed only after a warranty allocation acknowledgement is received from vendor warranty system 117.

By providing warranty recommendations based on device location, a vendor can offer customers flexibility in choosing and dynamically changing warranties post deployment. Customers will also have a cost benefit by applying a suitable warranty for the actual deployment location. Customers may also receive dynamic updates of changes in warranty offering based on location. Moreover, this provides customers with better centralized warranty management for distributed systems across geographical location.

Figure 5:
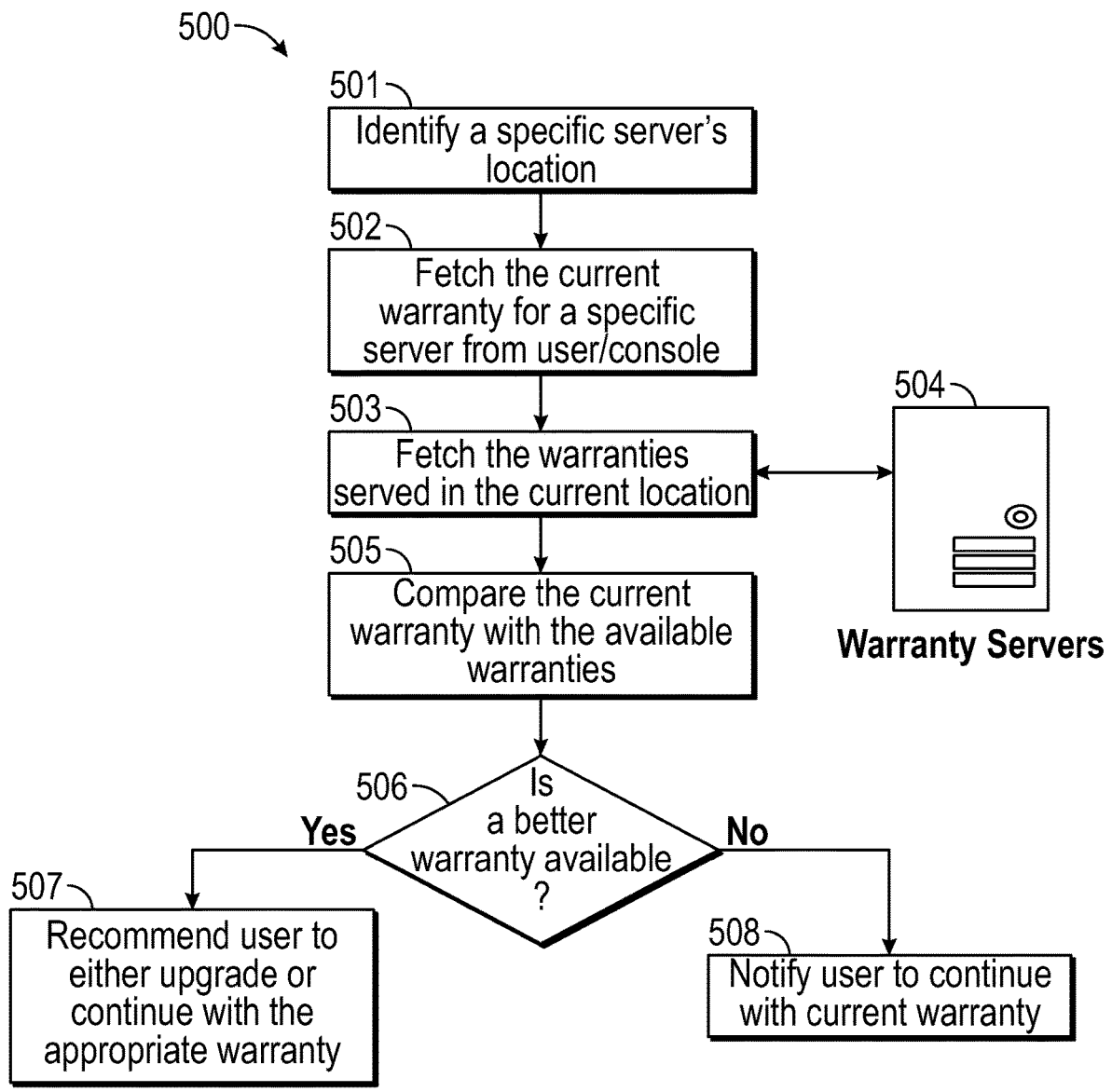
FIG. 5 is a flowchart illustrating a process for attaching a warranty offering to a geographic location.

FIG. 5 is a flowchart 500 illustrating a process for attaching a warranty offering to a geographic location. Based on the logistics availability of service engineers and replacement parts, the time required to meet customer needs will vary from location to location. Accordingly, in some embodiments, warranty offerings are attached to a geographic location. The available warranties may be selected, for example, using an initial study that is performed while opening services in a particular location. The LBWM is tool that gives fine-grained warranty suggestions using system location, current system warranty, and available warranties offered in a specific location. In step 501, a specific server's location is identified. The system location may be determined, for example, by fetching the address of a system from vendor order systems (e.g., a shipping address) using a service tag, serial number, or other unique server identifier. If a data center administrator or service engineer is near the server, they may use a mobile application for monitoring and managing server, such as the Dell EMC OpenManage Mobile from Dell Inc. The GPS location of the mobile device running the application can be used to locate the server, which location may be updated in management consoles. Alternatively, the server location may be updated by a customer through different management consoles.

In step 502, the current warranty for the specific server is fetched from a customer or a management console. In step 503, the warranties served in the location derived in step 501 are fetched, such as from a warranty server 504 in which warranties, UWTs, and location mapping is available.

In step 505, the current warranty for the specific server is compared to the warranties available in the location. In step 506, a determination is made whether a better warranty is available for the specific server when operated in the location. This may be accomplished, for example, by determining if the probable warranties collected in step 503 are appropriate for the specific server and then sort the offered warranties in ascending order based on the best SLA for that location. If a better warranty is available, then in step 507 a recommendation is made to the customer to either upgrade the current warranty or to select another appropriate warranty. If none of the available warranties for the location are better than the current warranty, then in step 508 the customer is notified that they should continue with the current warranty.

Referring to FIG. 1, Un-bound Warranty Tokens (UWTs) 116 may be digital warranty tokens that can be purchased by customers in advance and applied to IHS systems 107a-d and severs later based on deployment criteria. Upon binding a particular UWT 116 to a server's service tag, for example, a request will be sent to the vendor's warranty server 117, which verifies the inputs and sends acknowledgement back if the request satisfies all the conditions. The warranty records are then updated in the vendor's warranty records repository 117. The duration of the warranty will typically vary depending on the current life of the system.

Figure 6:
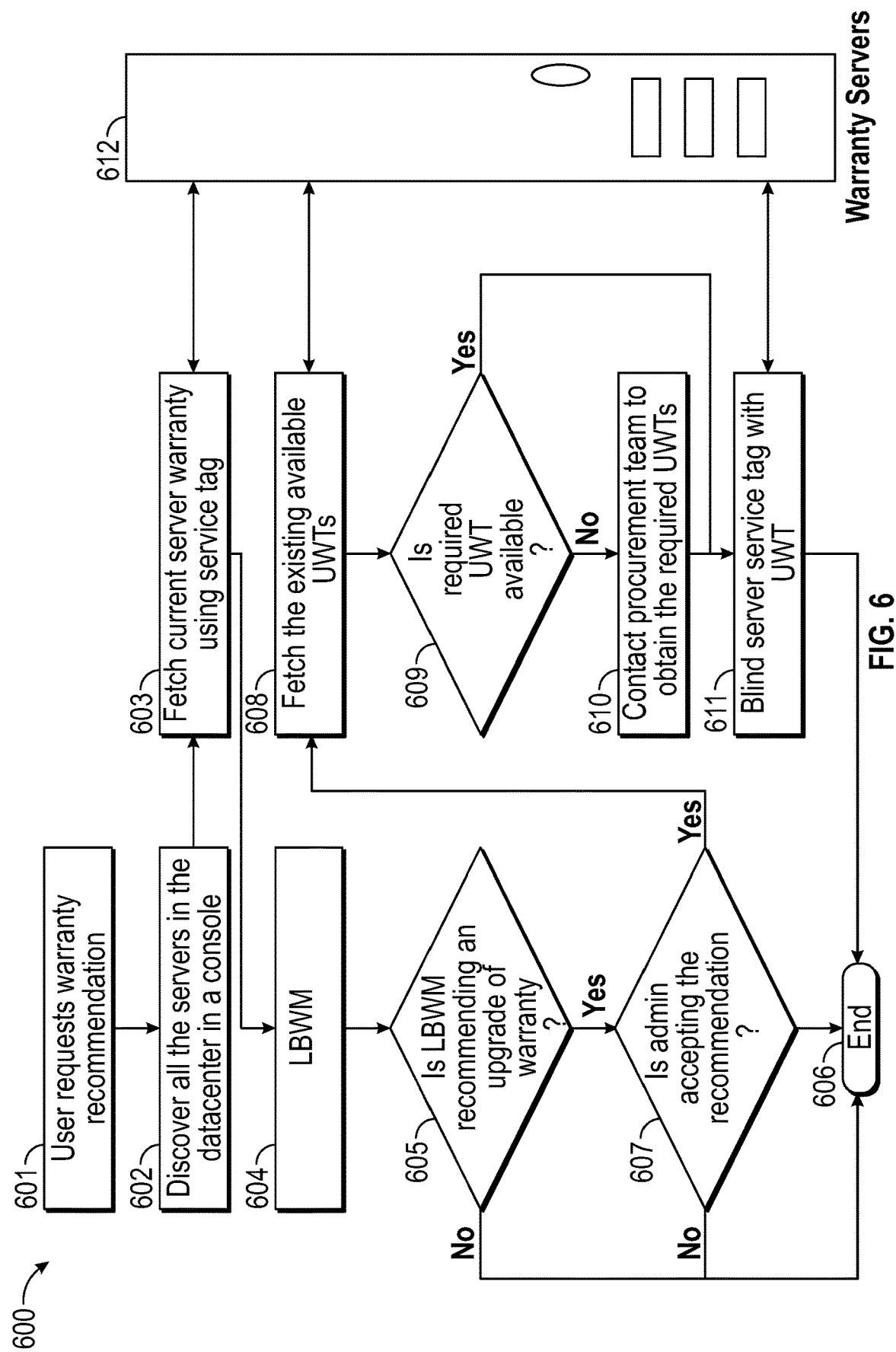
FIG. 6 is a flowchart illustrating a process for determining whether warranties in a data center should be updated and assigning UMTs to servers.

FIG. 6 is a flowchart 600 illustrating a process for determining whether warranties in a data center should be updated and assigning UWTs to servers. In step 601, a user requests a warranty recommendation. The request may be made, for example, using a system management console. The request can be made on demand basis or can be scheduled. In step 602, all of the servers for a particular data center are discovered through the system management console. In step 603, the current warranty for each server in the data center is fetched from a warranty system 612. The warranties may be identified using a server service tag, for example. The warranty system 612 may be a vendor system that maintains customer accounts with records of purchases, service histories, and warranties.

In step 604, a warranty suggestion is requested from the LBWM. The request may be initiated through a console request to the LBWM system for a potential warranty and the LBWM responds with a list of potential warranties with the first suggestion being most preferred. Generally, there are three possibilities expected from the LBWM recommendation. First, a suggested potential warranty and the current warranty for the system are same and, therefore, no action is required. Second, a suggested warranty has a better SLA than the current warranty SLA and, by assigning suitable UWTs, the customer can move to the suggested SLA. Third, the SLA of the current system warranty is not available in the requested data center location and, therefore, the suggested warranty has the best SLA available for that location. If a server is currently assigned a UWT that is associated with a warranty SLA that cannot be met at the current location, then the user can move that UWT to a server that is located in a data center where the appropriate warranty coverage is available. Then user can then change the server warranty to the best available suggested warranty for the current location.

A determination is made in step 605 whether the LBWM is recommending a warranty upgrade. If a warranty upgrade is not suggested, then the process moves to step 606 and the recommendation process ends. On the other hand, if a warranty upgrade is recommended in step 605, then the process moves to step 607 where a determination is made whether the customer, such as the data center administrator, has accepted the recommendation. If the customer declines the upgrade, then the process moves to step 606 and ends. Otherwise, the process moves to step 608 and existing available UWTs are retrieved from the warranty system 612.

In step 609, a decision is made whether the required UWTs for the recommended warranties are already available to the customer. If the required UWTs are not available, then in step 610 the customer's procurement team is contacted to obtain the required UWTs. Once the required UWTs are available, the servers' service tags are bound with the UWTs in step 611. The process then ends at 606.

Figure 7:
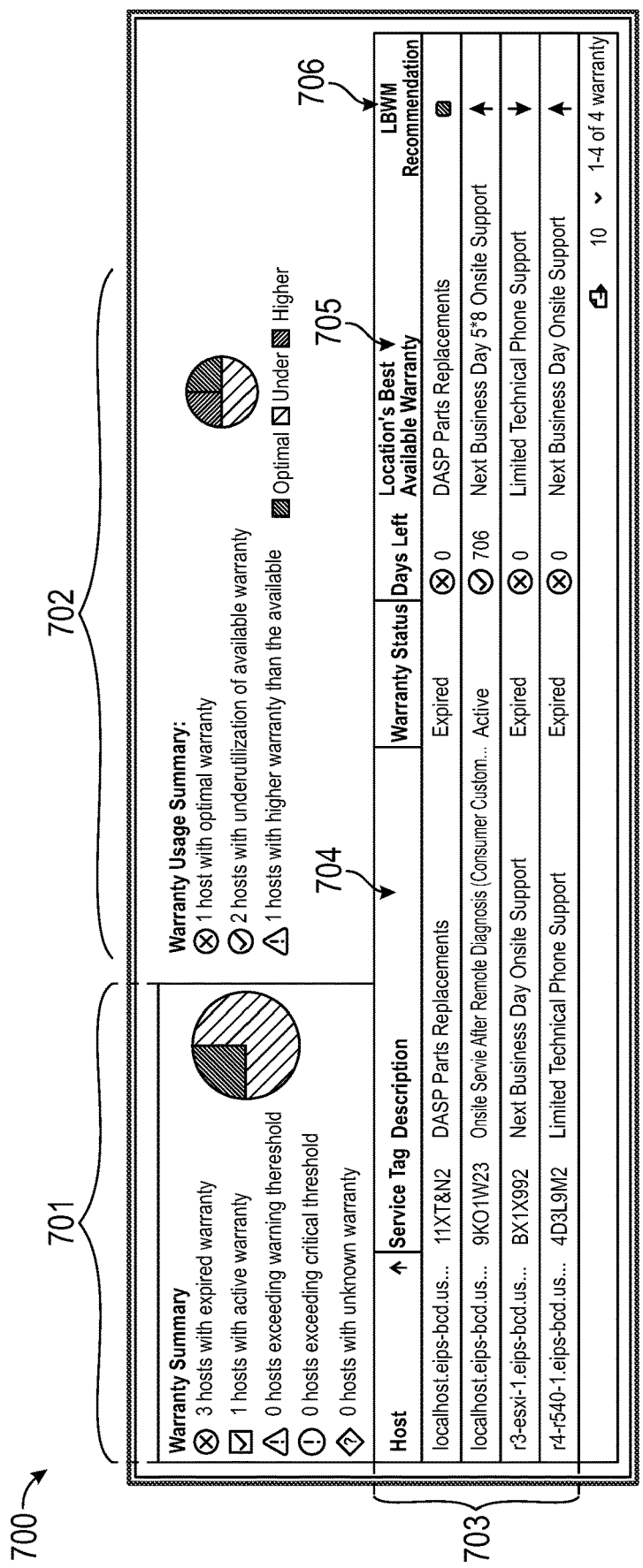
FIG. 7 illustrates a user interface for presenting LBWM evaluations and warranty recommendations for a particular data center to a user.

FIG. 7 illustrates a user interface 700 for presenting LBWM evaluations and warranty recommendations for a particular data center to a user. In one embodiment, a system management console may display interface 700 to the user. A warranty status summary section 701 provides information graphically and in text to identify warranties that are active, expired, or exceeding a threshold. A warranty usage summary 702 provides information graphically and in text to identify warranties that are providing excess, adequate, or insufficient coverage to various servers. Detailed warranty information is shown in section 703 with a row for each server in a data center. The current warranty for each server is listed in column 704. The best available warranty for each server, as determined by the LBWM, is listed in column 705 and the LBWM's recommended action is shown in column 706. In one embodiment, the recommendations are shown as icons or some other graphic annotation, such as an up arrow (i.e., upgrade recommended), down arrow (i.e., downgrade recommended), or a neutral icon, such as a square (i.e., no change recommended), which allows the user to quickly interpret the warranty change recommendations for an entire data center or across multiple data centers.

Figure 8:
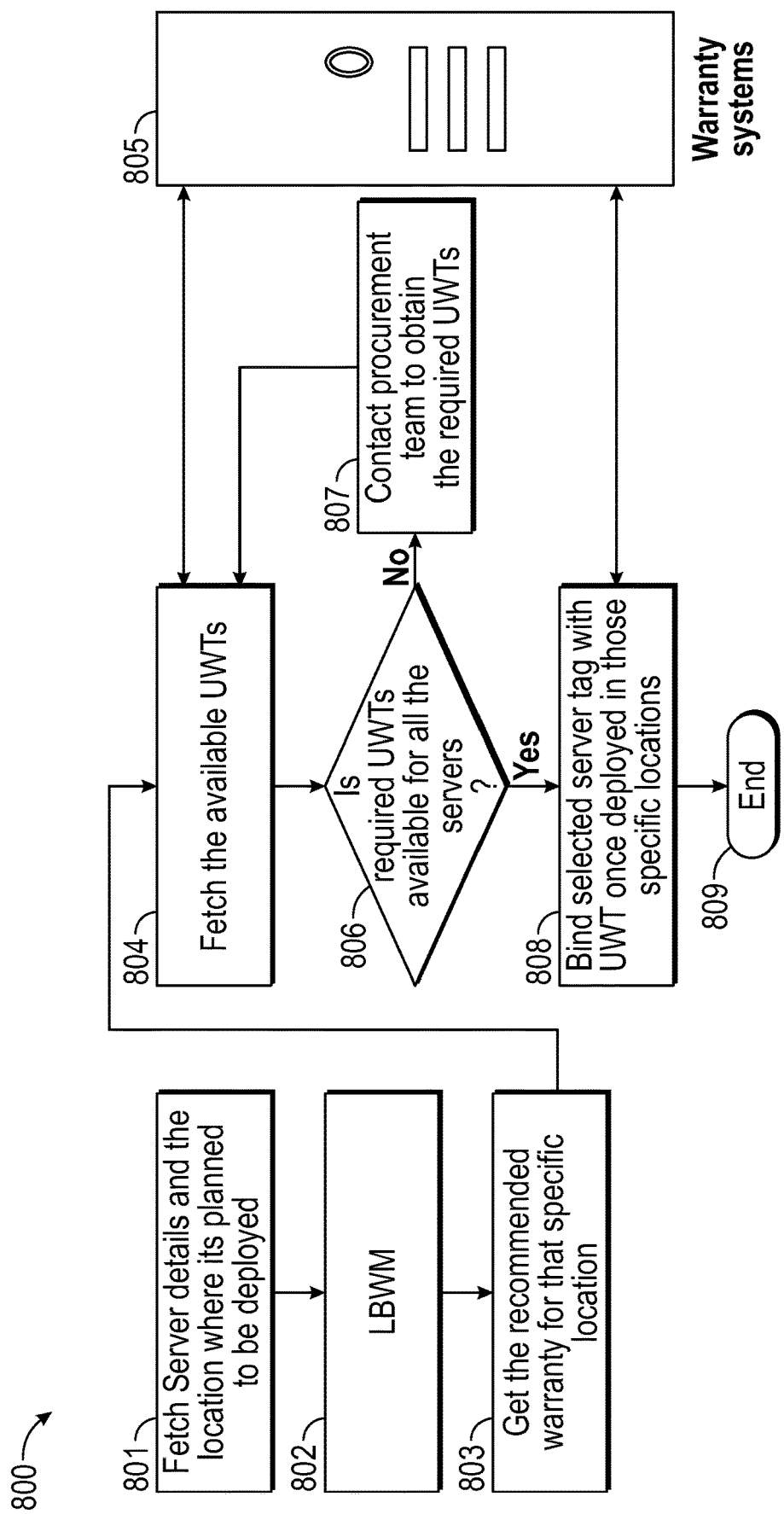
FIG. 8 is a flowchart illustrating a process for obtaining a warranty coverage for a new server deployment.

FIG. 8 is a flowchart 800 illustrating a process for obtaining a warranty coverage for a new server deployment. In step 801, the server details are retrieved, and the deployment location is identified. In step 802, the server details and location are provided to the LBWM, and a warranty suggestion is requested. In step 803, the LBWM provides a list of potential warranties with the first suggestion being most preferred. In step 804, the customer's available UWTs are fetched from a warranty system 805. In step 806, a decision is made whether the required UWTs for the recommended warranty is already available to the customer. If the required UWTs are not available, then in step 807 the customer's procurement team is contacted to obtain the required UWTs. The available UWTs are evaluated again in steps 804 and 806 until all servers to be deployed are paired with the appropriate UWTs. In step 808, once the required UWTs are available, the servers' service tags are bound with the UWTs. The process then ends at 809.

In an example embodiment, a customized warranty system for providing a best possible SLA comprises a processor and a memory coupled to the processor The memory has program instructions stored thereon that, upon execution by the processor, cause the system to retrieve location and service-related parameters for IHSs as a training set for a deep learning neural network; and train an SLA model using the deep learning neural network by selecting random data features from the training set and building decision trees to calculate a best SLA for each data feature set, wherein the best SLA corresponds to an SLA with a fastest available replacement time and a highest available support type. The program instructions further cause the system to calculate a predicted SLA by averaging the best SLA for the data feature sets; validate the predicted SLA using an actual service time and delivery time for IHSs to determine whether the predicted SLA was met; and calculate a best possible SLA for a specific IHS using the SLA model. The specific IHS may be, for example, a new server to be installed at a data center.

The location and service-related parameters may comprise one or more of: a device location, a replacement part availability, a service engineer availability, a logistics delivery team availability, historical service SLA data, a proximity between a data center and a service center, a proximity between a data center and a warehouse, a service time logged by service personnel, and a delivery time logged by a delivery team.

The program instructions may further cause the system to validate the predicted SLA by determining whether the actual service time and delivery time are within a predefined threshold of the predicted SLA. The predefined threshold may be 0.5%.

The program instructions may further cause the system to retrain the SLA model using the deep learning neural network using updated location, service time, and delivery time parameters.

The program instructions may further cause the system to receive a desired SLA from a user, wherein the desired SLA corresponds to the specific IHS; determine if the desired SLA can be met by the service level of the best possible SLA; and if the desired SLA can be met, then creating a warranty offer that includes the desired SLA.

The program instructions may further cause the system to receive a current warranty for the specific IHS from a user; identify the location and warranty SLA associated with the current warranty; determine if the best possible SLA offers a faster available replacement time or a higher available support type than the warranty SLA; and if the best possible SLA comprises a faster available replacement time or a higher available support type than the warranty SLA, then creating a warranty offer that includes the best possible SLA.

In another example embodiment, a method for providing warranty recommendations based on device location comprises identifying a device location; retrieving a current warranty for the device using a device identifier; retrieving one or more available warranties that are served at the device location, wherein terms of the available warranties are selected based upon the location of service centers or warehouses relative to the location; determining the SLA for the one or more of the available warranties and the current warranty; if one or more available warranties have a better SLA than the current warranty, then identifying a list of possible warranty upgrades to a user; and if no available warranties have a better SLA than the current warranty, then notifying the user to continue with the current warranty. The device may be a server, and the location may be a data center. The device location may be identified using one or more of: a shipping address used by a vendor, using GPS associated with a mobile management application, and a device address assigned in a system management application. The current warranty may be retrieved from a vendor warranty system or server.

The method may further comprise displaying, on a user interface, warranty information for a plurality of devices; and displaying an icon for each device, wherein the icon indicates whether there are one or more available warranties that have a better SLA than the current warranty for that device.

The method may further comprise receiving a warranty selection from the user; identifying unbound warranty tokens associated with the user, wherein the unbound warranty tokens are not assigned to any device; and assigning a selected unbound warranty token to the device, wherein the selected unbound warranty token has an SLA that corresponds to the user's warranty selection. The selected unbound warranty token may be assigned to the device by binding the unbound warranty token to a service tag for the device.

The method may further comprise receiving a warranty selection from the user; identifying previously obtained unbound warranty tokens already associated with the user, wherein the previously obtained unbound warranty tokens are not assigned to any device; evaluating whether the previously obtained unbound warranty tokens have an SLA that corresponds to the user's warranty selection; and procuring a new unbound warranty token from a vendor when the previously obtained unbound warranty tokens do not correspond to the user's warranty selection.

In a further example embodiment, a warranty evaluation system for providing a best possible SLA for an IHS comprises a processor and a memory coupled to the processor. The memory has program instructions stored thereon that, upon execution by the processor, cause the system to identify the location of an IHS; obtain a current warranty for the ISH, wherein the current warranty comprises a current SLA; using an SLA model for a deep learning neural network, calculate a best SLA the IHS location, wherein the best SLA corresponds to an SLA with a fastest available replacement time; compare the best SLA and the current SLA; and if the best SLA is faster than the current SLA, then create a warranty for the IHS comprising the best SLA.

The program instructions may further cause the warranty evaluation system to, if the best SLA is not faster than the current SLA, designate the location for evaluation for improved service center or warehouse support.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A customized warranty system for providing a best possible service level agreement (SLA), comprising:
   a processor; and
   a memory coupled to the processor, the memory having program instructions stored thereon that, upon execution by the processor, cause the system to:
      retrieve a data feature set comprising location and service-related parameters for Information Handling Systems (IHSs) to use as a training set for a deep learning neural network;
      train an SLA model using the deep learning neural network by selecting random data features from the training set and building decision trees to calculate a best SLA for each respective data feature set, wherein the best SLA corresponds to an SLA with a fastest available replacement time and a highest available support type;
      calculate a predicted best possible SLA for a specific IHS by averaging the best SLA of each data feature sets;
      validate the predicted best possible SLA using an actual on-field SLA comprising actual service time and delivery time for IHSs to determine whether the predicted best possible SLA was met by determining whether the actual service time and delivery time are within a predefined threshold of the predicted best possible SLA;
      if the predicted best possible SLA is above the predefined threshold, retrain the SLA model using the deep learning neural network using updated location, actual service time, and deliver time parameters until the predicted best possible SLA is below the predefined threshold;
      if the predicted best possible SLA is below the predefined threshold, output the predicted best possible SLA as the best possible SLA.

2. The customized warranty system of claim 1, wherein the location and service- related parameters comprise one or more of: a device location, a replacement part availability, a service engineer availability, a logistics delivery team availability, historical service SLA data, a proximity between a data center and a service center, a proximity between a data center and a warehouse, a service time logged by service personnel, and a delivery time logged by a delivery team.

3. The customized warranty system of claim 1, wherein the specific IHS is a new server to be installed at a data center.

4. The customized warranty system of claim 1, wherein the predefined threshold is 0.5%.

5. The customized warranty system of claim 1, wherein the instructions, upon execution by the processor, further cause the system to:
- receive a desired SLA request from a user, wherein the desired SLA request corresponds to the specific IHS;
- determine if the desired SLA request can be met by the service level of the best possible SLA; and
  - if the desired SLA can be met, then creating a warranty offer that includes the desired SLA; and
  - if the desired SLA cannot be met, the desired SLA request is logged for input for future IHS expansion decisions.

6. The customized warranty system of claim 1, wherein the instructions, upon execution by the processor, further cause the system to:
- evaluate a current warranty for the specific IHS from a user;
- identify the location and current warranty SLA corresponding to the current warranty;
- determine if the best possible SLA offers a faster available replacement time or a higher available support type than the current warranty SLA;
  - if the best possible SLA comprises a faster available replacement time or a higher available support type than the current warranty SLA, then create a warranty offer that includes the best possible SLA; and
  - if the best possible SLA is not better than the current warranty SLA, then notify the user that a better SLA is not available.

* * * * *